United States Patent
Sha et al.

(10) Patent No.: US 11,546,961 B2
(45) Date of Patent: Jan. 3, 2023

(54) METHOD AND DEVICE FOR RELEASING RADIO RESOURCE CONTROL CONNECTION, BASE STATION AND USER EQUIPMENT

(71) Applicant: ZTE Corporation, Shenzhen (CN)

(72) Inventors: Xiubin Sha, Shenzhen (CN); Ting Lu, Shenzhen (CN); Bo Dai, Shenzhen (CN); Xu Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 33 days.

(21) Appl. No.: 16/611,027

(22) PCT Filed: May 4, 2018

(86) PCT No.: PCT/CN2018/085658
§ 371 (c)(1),
(2) Date: Nov. 5, 2019

(87) PCT Pub. No.: WO2018/202147
PCT Pub. Date: Nov. 8, 2018

(65) Prior Publication Data
US 2020/0187291 A1   Jun. 11, 2020

(30) Foreign Application Priority Data

May 5, 2017 (CN) .......................... 201710313859.1

(51) Int. Cl.
*H04W 76/27* (2018.01)
*H04L 1/00* (2006.01)
(Continued)

(52) U.S. Cl.
CPC ............ *H04W 76/27* (2018.02); *H04L 1/003* (2013.01); *H04W 72/042* (2013.01);
(Continued)

(58) Field of Classification Search
CPC ... H04W 76/27; H04W 72/042; H04W 76/19; H04W 76/38; H04W 8/00; H04L 1/003
See application file for complete search history.

(56) References Cited

U.S. PATENT DOCUMENTS

| | | | |
|---|---|---|---|
| 9,929,943 B1* | 3/2018 | Velusamy | ............... H04L 69/40 |
| 2011/0014912 A1* | 1/2011 | Ahluwalia | ............ H04W 76/11 |
| | | | 455/435.1 |

(Continued)

FOREIGN PATENT DOCUMENTS

| CN | 102595646 A | 7/2012 |
|---|---|---|
| CN | 106572544 A | 4/2017 |

OTHER PUBLICATIONS

International Search Report for corresponding application PCT/CN2018/085658 filed May 4, 2018; dated Jul. 11, 2018.

*Primary Examiner* — Ayanah S George
(74) *Attorney, Agent, or Firm* — Cantor Colburn LLP

(57) ABSTRACT

Provided are a method and device for releasing radio resource control connection, a base station, a user equipment and a computer-readable storage medium. The method includes that a base station configures radio resource control connection release control information for a user equipment before the base station is triggered to release a radio resource control connection of the user equipment; and the base station makes a decision according to the radio resource control connection release control information when the base station releases the radio resource control connection of the user equipment.

13 Claims, 9 Drawing Sheets

(51) Int. Cl.
  *H04W 72/04* (2009.01)
  *H04W 76/19* (2018.01)
  *H04W 76/38* (2018.01)
  *H04W 8/00* (2009.01)

(52) U.S. Cl.
  CPC ........... *H04W 76/19* (2018.02); *H04W 76/38* (2018.02); *H04W 8/00* (2013.01)

(56) References Cited

U.S. PATENT DOCUMENTS

| | | | |
|---|---|---|---|
| 2012/0127957 A1* | 5/2012 | Koskinen | H04W 36/0022 370/331 |
| 2012/0269122 A1* | 10/2012 | Lee | H04W 76/36 370/328 |
| 2013/0039287 A1* | 2/2013 | Rayavarapu | H04W 76/28 370/329 |
| 2013/0195049 A1* | 8/2013 | Yang | H04W 72/04 370/329 |
| 2014/0269637 A1 | 9/2014 | Banister | |
| 2015/0098446 A1* | 4/2015 | Ye | H04W 28/0226 370/331 |
| 2015/0172975 A1* | 6/2015 | Hansson | H04W 36/00835 455/436 |

* cited by examiner

METHOD AND DEVICE FOR RELEASING RADIO RESOURCE CONTROL CONNECTION, BASE STATION AND USER EQUIPMENT

CROSS-REFERENCE TO RELATED APPLICATIONS

This is a National Stage Application, filed under 35 U.S.C. 371, of International Patent Application No. PCT/CN2018/085658, filed on May 4, 2018, which claims priority to Chinese patent application No. 201710313859.1 filed on May 5, 2017, contents of both of which are incorporated herein by reference in their entireties.

TECHNICAL FIELD

The present disclosure relates to the wireless communication technology and, in particular, to a method and device for releasing radio resource control connection, a base station, a user equipment and a computer-readable storage medium.

BACKGROUND

Machine-to-machine (M2M) communication is an important topic of current research in the 5th generation technology (5G) and an important application domain of future wireless communication. In the M2M topic, user equipment (UE) energy saving is the key to the success of this technology. The quick release of radio resource control (RRC) connection after the transmission of UE data is a way to improve UE energy saving.

At present, the release of RRC connection is triggered by a RRC Connection Release message of Acknowledge Mode (AM). After the transceiving of UE data is completed, the UE needs to wait for the RRC Connection Release message for a certain period of time. This is power-consuming if the UE is in connected mode during this period of time. The UE needs to send a Radio Link Control (RLC) Acknowledgement (Ack) to the evolved NodeB (eNodeB) after receiving the RRC Connection Release message. This is also power-consuming. In addition, according to the current standard, to ensure that the eNodeB receives the RLC Ack, after the UE sends the RLC Ack, the UE still needs to stay in connected mode for a period of time before entering idle mode. It is also power-consuming for the UE to be in connected mode. A reduction in UE power consumption during the period of time from completing the transceiving of UE data to entering idle state is significant in improving the energy saving of M2M UE.

SUMMARY

The present disclosure provides a method and device for releasing radio resource control connection, a base station, a user equipment and a computer-readable storage medium, which can reduce the power consumption in the process of releasing the RRC connection in current standards and reduce UE power consumption.

To achieve the object of the present disclosure, at least one embodiment of the present disclosure provides a method for releasing radio resource control connection. The method includes that a base station configures RRC connection release control information for a UE before being triggered to release a RRC connection; and the base station makes a decision according to the RRC connection release control information when releasing the RRC connection of the UE.

At least one embodiment of the present disclosure provides a device for releasing radio resource control connection. The device includes a generation unit, a configuration unit and a connection release unit.

The generation unit is configured to generate RRC connection release control information of a UE.

The configuration unit is configured to configure the RRC connection release control information for the user equipment before the connection release unit is triggered to release the RRC connection of the UE.

The connection release unit is configured to make a decision according to the RRC connection release control information when releasing the RRC connection of the UE.

At least one embodiment of the present disclosure provides a base station. The base station includes a memory and a processor. The memory stores a program that, when executed by the processor, causes the processor to perform the following operations: configuring RRC connection release control information for a UE before being triggered to release RRC connection of the UE; and making a decision according to the RRC connection release control information when releasing the RRC connection of the UE.

At least one embodiment of the present disclosure provides a method for releasing radio resource control connection. The method includes that a UE acquires RRC connection release control information from a base station before automatically releasing a RRC connection; and the UE makes a decision according to the RRC connection release control information or transports the RRC connection release control information to a higher layer when automatically releasing the RRC connection.

At least one embodiment of the present disclosure provides a device for releasing radio resource control connection. The device includes an information acquisition unit and a connection release unit.

The information acquisition unit is configured to acquire RRC connection release control information from a base station before the connection release unit automatically releases the RRC connection of a UE.

The connection release unit is configured to make a decision according to the RRC connection release control information or to transport the RRC connection release control information to a higher layer when automatically releasing the RRC connection of the UE.

At least one embodiment of the present disclosure provides a UE. The UE includes a memory and a processor. The memory stores a program that, when read and executed by the processor, causes the processor to perform the following operations: acquiring RRC connection release control information from a base station before automatically releasing RRC connection of the UE; and making a decision according to the RRC connection release control information or transporting the RRC connection release control information to a higher layer when automatically releasing the RRC connection of the UE.

At least one embodiment of the present disclosure provides a computer-readable storage medium. The computer-readable storage medium stores computer-executable instructions configured for implementation of the preceding methods for releasing RRC connection.

In the present disclosure, a UE is configured with RRC connection release control information before automatically releasing RRC connection of the UE so that the UE can perform subsequent operations according to the RRC connection release control information after automatically releasing the RRC connection, thereby reducing UE power consumption.

Other features and advantages of the present disclosure will be elaborated hereinafter in the description and, moreover, partially become apparent from the description, or will be understood through implementation of the present disclosure. The object and other advantages of the present disclosure can be achieved and obtained through structures set forth in the description, claims and drawings.

DETAILED DESCRIPTION

The steps shown in the flowcharts in the accompanying drawings may be performed in a computer system such as a set of computer-executable instructions. Moreover, although logical sequences are shown in the flowcharts, in some cases, the shown or described steps may be performed in sequences different from the sequences described herein.

In the study of standards R14, the strategy of triggering quick release of RRC connection by BSR=0 reported by a UE is introduced. The basic idea of this strategy is to send, after UE data transmission is completed, the BSR=0 indication to an eNodeB to trigger the eNodeB to release the RRC connection. This strategy can shorten the time interval from completion of the UE data transmission to an RRC connection release message, but does not reduce UE power consumption arising from the phenomenon where after receiving the RRC connection release message, the UE sends an RLC acknowledgement and remains in a connected mode for a period of time.

In the study of standards R14, to improve the RRC state consistency between the UE and the eNodeB, a data inactivity timer is introduced. The timer is started after UE data transceiving is completed and the UE automatically releases the RRC connection when the data inactivity timer times out and the UE has no new data transceiving requirement. With this function, the RRC connection can be fast released automatically after the UE data transceiving is completed and the RRC state inconsistency between the UE and the eNodeB can be avoided.

In addition, no matter in an NB-IoT or eMTC system or in a subsequent New Radio (NR) system, the RRC connection release message carries information such as an RRC release mode (including the mode of context suspension before release and the mode of release of all radio resources), an extended wait timer (to prevent the UE NAS layer from frequently initiating a traffic request), or carrier redirection information (to determine the camped carrier after the UE leaves the connected mode). In the case where the UE automatically releases the RRC connection, since the UE cannot receive the RRC connection release message when the RRC connection is released, the related information is not available currently and the UE cannot use the RRC connection auto-release function and the UE context suspension function simultaneously.

In the present disclosure, the UE is configured with RRC connection release control information before automatically releasing the RRC connection so that the UE can perform subsequent operations according to the RRC connection release control information after automatically releasing the RRC connection. The present disclosure will be described below in conjunction with embodiments.

Embodiment One

Figure 1:
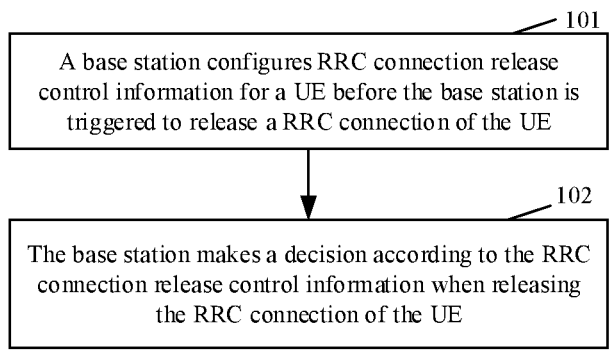
FIG. 1 is a flowchart of a method for releasing radio resource control connection according to an embodiment of the present disclosure.

This embodiment provides a method for RRC control connection. As shown in FIG. 1, the method includes the steps described below.

In step 101, a base station configures RRC connection release control information for a UE before the base station is triggered to release a RRC connection.

In step 102, the base station makes a decision according to the RRC connection release control information when the RRC connection of the UE is released.

In the present disclosure, the base station does not need to send an RRC connection release message and triggers the RRC connection release of the UE in other manners.

In an optional embodiment of the present disclosure, the RRC connection release control information includes at least one of an RRC release mode indication, an extended wait timer, or carrier redirection information.

In an optional embodiment of the present disclosure, the RRC release mode indication indicates that the context of the UE is stored when the UE automatically releases the RRC connection or indicates that all radio resources are released when the UE automatically releases the RRC connection. The RRC release mode may be indirectly embodied through RRC release reasons. For example, when the release is RRC suspension, the context of the UE is stored when the RRC connection is released.

In an optional embodiment of the present disclosure, if the RRC release mode indication indicates that the context of the UE is stored before the release, then the RRC release mode indication includes UE suspension/resume identifier information. The UE suspension/resume identifier information is used by the UE to identify the stored context to facilitate identification of the stored context when the RRC connection is resumed subsequently.

In an optional embodiment of the present disclosure, the extended wait timer includes the extended wait timer for traffic and/or the extended wait timer for a control plane (CP) optimization scheme and is used by the NAS layer to decide whether a new traffic request can be initiated for an idle UE.

In an optional embodiment of the present disclosure, the carrier redirection information includes at least one of camped carrier information in idle mode or carrier camping offset in an idle mode.

In an optional embodiment of the present disclosure, the carrier camping offset in idle mode is used for cell selection and/or cell reselection of the UE in idle mode so that the UE can camp on the designated carrier more easily; if the carrier camping offset in idle mode is included, then the effective duration or effective timer of the carrier camping offset in idle mode can be included for determination of the effective duration the carrier camping offset in idle mode.

In an optional embodiment of the present disclosure, the base station configures the RRC connection release control information for the UE through one of an RRC connection establishment message, an RRC connection resume message, an RRC connection reconfiguration message, an RRC connection re-establishment message, a downlink information direct transfer message or a media access control (MAC) control element.

In an optional embodiment of the present disclosure, the method further includes that the base station acquires RRC connection release capability information of the UE before configuring the RRC connection release control information for the UE.

In an optional embodiment of the present disclosure, the base station acquires the RRC connection release capability information of the UE from one of the UE, a mobile management entity (MME), or the source base station of the UE.

In an optional embodiment of the present disclosure, the base station is triggered to release the RRC connection when one of the following conditions is satisfied: a configured data inactivity timer times out; a buffer status report indicating 0 buffer octets sent by the UE is received; or the base station sends the RRC connection release indication to the UE.

The step in which the release is triggered after the buffer status report indicating 0 buffer octets sent by the UE is received includes that the base station needs to acquire the RRC connection release capability information of the UE before receiving the BSR=0 indication reported by the UE; the base station automatically releases the RRC connection of the UE after the base station receives the RRC connection release capability information reported by the UE and receives BSR=0 reported by the UE.

The step in which the release is triggered after the base station sends the RRC connection release indication to the UE includes that if the RRC connection release of the UE is triggered by the RRC connection release indication sent by the base station, then the base station needs to acquire the RRC connection release capability information of the UE before configuring the RRC connection release control information for the UE; after data transmission is completed, the base station sends the RRC connection release indication to the UE and the RRC connection of the UE is automatically released.

In an optional embodiment of the present disclosure, the base station sends the RRC connection release indication to the UE in one of the following manners: carrying the RRC connection release indication in a predefined downlink control information format; or carrying the RRC connection release indication in a predefined MAC CE format.

In an optional embodiment of the present disclosure, the step in which the base station makes a decision according to the RRC connection release control information when the RRC connection of the UE is automatically released includes that the context of the UE is suspended when the RRC connection is automatically released if the RRC release mode indication carried in the RRC connection release control information configured by the base station for the UE indicates that the context of the UE is stored before the release; otherwise, all radio resources of the UE are released when the RRC connection is automatically released.

Embodiment Two

Figure 2:
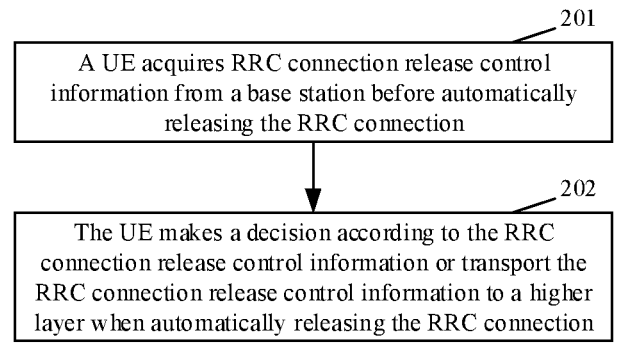
FIG. 2 is a flowchart of a method for releasing radio resource control connection according to an embodiment of the present disclosure.

This embodiment provides a method for releasing RRC connection. As shown in FIG. 2, the method includes the steps described below.

In step 201, a UE acquires RRC connection release control information from a base station before automatically releasing the RRC connection.

In step 202, the UE makes a decision according to the RRC connection release control information or transport the RRC connection release control information to a higher layer when automatically releasing the RRC connection.

The RRC connection auto-release in the present disclosure is different from RRC connection release after an RRC connection release message is received in the related art.

In an optional embodiment of the present disclosure, the RRC connection release control information includes at least one of an RRC release mode indication, an extended wait timer, or carrier redirection information.

In an optional embodiment of the present disclosure, the RRC release mode indication indicates that the context of the UE is stored before the release or indicates that all radio resources of the UE are released. The RRC release mode may be indirectly embodied through RRC release reasons. For example, when the release reason is RRC suspension, the context of the UE is stored before the RRC is released.

In an optional embodiment of the present disclosure, if the configured RRC connection release control information includes the extended wait timer, then the UE stores the extended wait timer, and transfers the extended wait timer to a higher layer (for example, NAS layer) when automatically releasing the RRC connection subsequently so that the higher layer decides whether to initiate a new traffic request for the UE in idle state.

In an optional embodiment of the present disclosure, if the configured RRC connection release control information includes the carrier redirection information, then the UE stores the carrier redirection information, and selects a camped carrier in idle mode according to the related information when automatically releasing the RRC connection subsequently.

In an optional embodiment of the present disclosure, the UE may acquire the RRC connection release control information through one of an RRC connection establishment message, an RRC connection resume message, an RRC connection reconfiguration message, an RRC connection re-establishment message, a downlink information direct transfer message or a MAC CE.

In an optional embodiment of the present disclosure, the method further includes that the UE reports RRC connection release capability information of the UE to the base station before acquiring the RRC connection release control information from the base station.

In an optional embodiment of the present disclosure, the method further includes that the RRC connection auto-release of the UE is triggered when one of the following conditions is satisfied: a data inactivity timer configured for the UE by a network times out; the UE sends a buffer status report indicating 0 buffer octets to the base station; or the RRC connection release indication sent by the base station is received.

In an optional embodiment of the present disclosure, if the RRC connection auto-release is triggered by the data inactivity timer configured for the UE, then the UE automatically releases the RRC connection of the UE when the data inactivity timer times out and the UE has no data transceiving requirement.

In an optional embodiment of the present disclosure, if the RRC connection auto-release is triggered by the BSR=0 indication sent after UE data transmission is completed, then the UE needs to report the RRC connection release capability information of the UE before reporting BSR=0; the UE automatically releases the RRC connection of the UE after the UE reports the RRC connection release capability information and reports BSR=0.

In an optional embodiment of the present disclosure, if the RRC connection auto-release is triggered by the RRC connection release indication sent by the base station, then the UE needs to report the RRC connection release capability information of the UE before receiving the RRC connection release indication; the UE automatically releases the RRC connection of the UE after the UE reports the RRC connection release capability information and receives the RRC connection release indication sent by the base station.

In an optional embodiment of the present disclosure, the method further includes that the UE acquires the RRC connection release indication sent by the base station in one of the following manners: a predefined downlink control information format or a predefined MAC CE format.

In an optional embodiment of the present disclosure, the latest received RRC connection release control information applies when the UE receives the RRC connection release control information from the base station multiple times, that is, the UE makes a decision according to the latest received RRC connection release control information when automatically releasing the RRC connection.

In an optional embodiment of the present disclosure, the step in which the UE makes a decision according to the RRC connection release control information when automatically releasing the RRC connection of the UE includes that the context of the UE is suspended when the RRC connection is automatically released if the RRC release mode indication carried in the RRC connection release control information indicates that the context of the UE is stored before the release; otherwise, the UE releases all radio resources of the UE when automatically releasing the RRC connection.

Embodiment Three

Figure 3:
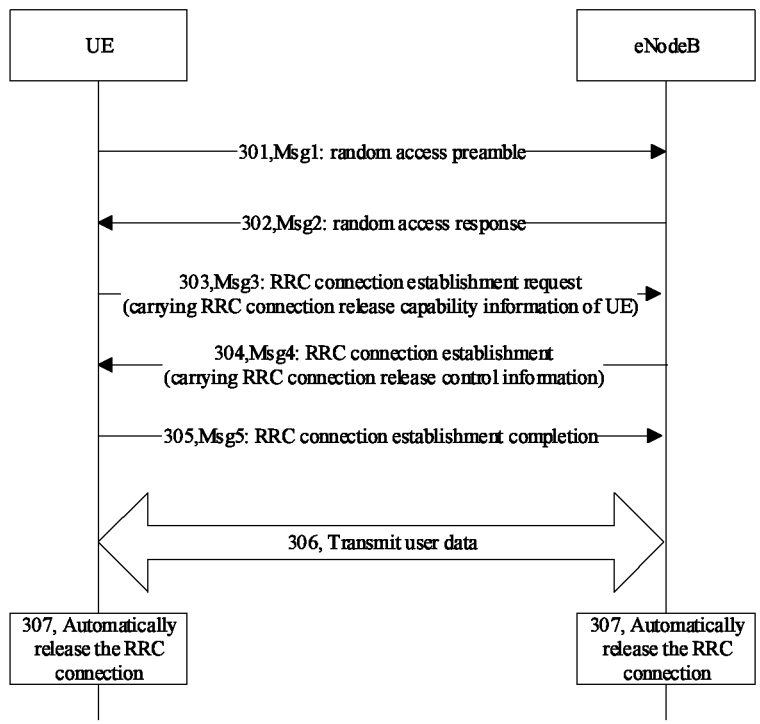
FIG. 3 is a flowchart illustrating reporting of RRC connection auto-release capability information by a UE and configuration of RRC connection release control information according to an embodiment of the present disclosure.

FIG. 3 is a flowchart illustrating of reporting of RRC connection auto-release capability information and configuration of RRC connection release control information according to an embodiment of the present disclosure. The process shown in FIG. 3 includes the steps described below.

In step 301, the UE sends a Msg1 (random access preamble) message to the eNodeB.

In step 302, the eNodeB sends a Msg2 (random access response) message to the UE.

In step 303, the UE sends a Msg3 (RRC connection establishment request) message to the eNodeB, where the RRC connection establishment request message carries the RRC connection release capability information of the UE.

The RRC connection release capability information of the UE may be indirectly indicated by whether the UE supports data inactivity timer processing, whether the UE is capable of releasing RRC connection immediately after sending BSR=0 or whether the UE is capable of receiving the RRC connection release indication sent by the eNodeB.

In step 304, the eNodeB sends a Msg4 (RRC connection establishment) message to the UE, where the RRC connection establishment message carries the RRC connection release control information.

The RRC connection release control information includes at least one of an RRC release mode indication, an extended wait timer, or carrier redirection information.

In step 305, the UE sends a Msg5 (RRC connection establishment completion) message to the eNodeB.

In step 306, the UE and the eNodeB transmit data based on the established RRC connection.

In step 307, the RRC connection is automatically released based on the RRC connection release capability information and the RRC connection release control information after data transmission between the UE and the eNodeB is completed.

In other embodiments of the present disclosure, the Msg3 may be an RRC connection resume request message, an RRC connection re-establishment request message or the like; accordingly, the Msg4 may be an RRC connection resume message, an RRC connection re-establishment message or the like and Msg5 may be an RRC connection resume completion message, an RRC connection re-establishment completion message or the like.

Embodiment Four

Figure 4:
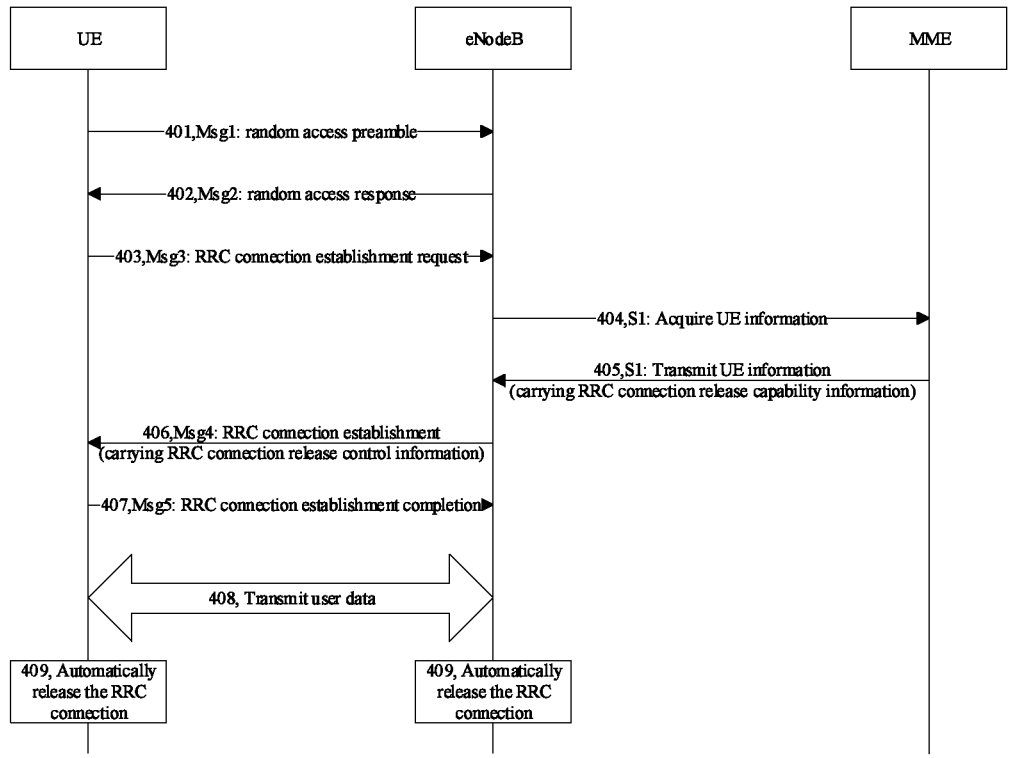
FIG. 4 is a flowchart illustrating reporting of RRC connection auto-release capability information by a UE and configuration of RRC connection release control information according to an embodiment of the present disclosure.

FIG. 4 is a flowchart illustrating acquisition of RRC connection auto-release capability information and RRC connection release control are acquired according to an embodiment of the present disclosure. The process shown in FIG. 4 includes the steps described below.

In step 401, the UE sends a Msg1 (random access preamble) message to the eNodeB.

In step 402, the eNodeB sends a Msg2 (random access response) message to the UE.

In step 403, the UE sends a Msg3 (RRC connection establishment request) message to the eNodeB, where the RRC connection establishment request message carries the RRC connection release capability information of the UE.

In step 404, the eNodeB sends a UE information acquisition message to a mobility management entity (MME).

In step 405, the MME sends a UE information transmission message to the eNodeB, where the RRC connection release capability information of the UE is carried in UE information transmission message.

The RRC connection release capability information of the UE may be indirectly indicated by whether the UE supports data inactivity timer processing, whether the UE is capable of releasing RRC connection immediately after sending BSR=0 or whether the UE is capable of receiving the RRC connection release indication sent by the eNodeB.

In step 406, the eNodeB sends a Msg4 (RRC connection establishment) message to the UE, where the RRC connection establishment message carries the RRC connection release control information.

The RRC connection release control information includes at least one of an RRC release mode indication, an extended wait timer, or carrier redirection information.

In step 407, the UE sends a Msg5 (RRC connection establishment completion) message to the eNodeB.

In step 408, the UE and the eNodeB transmit data based on the established RRC connection.

In step 409, the RRC connection is automatically released based on the RRC connection release capability information and the RRC connection release control information after data transmission between the UE and the eNodeB is completed.

In other embodiments of the present disclosure, the Msg3 may be an RRC connection resume request message, an RRC connection re-establishment request message or the like; accordingly, the Msg4 may be an RRC connection resume message, an RRC connection re-establishment message or the like and Msg5 may be an RRC connection resume completion message, an RRC connection re-establishment completion message or the like.

Embodiment Five

Figure 5:
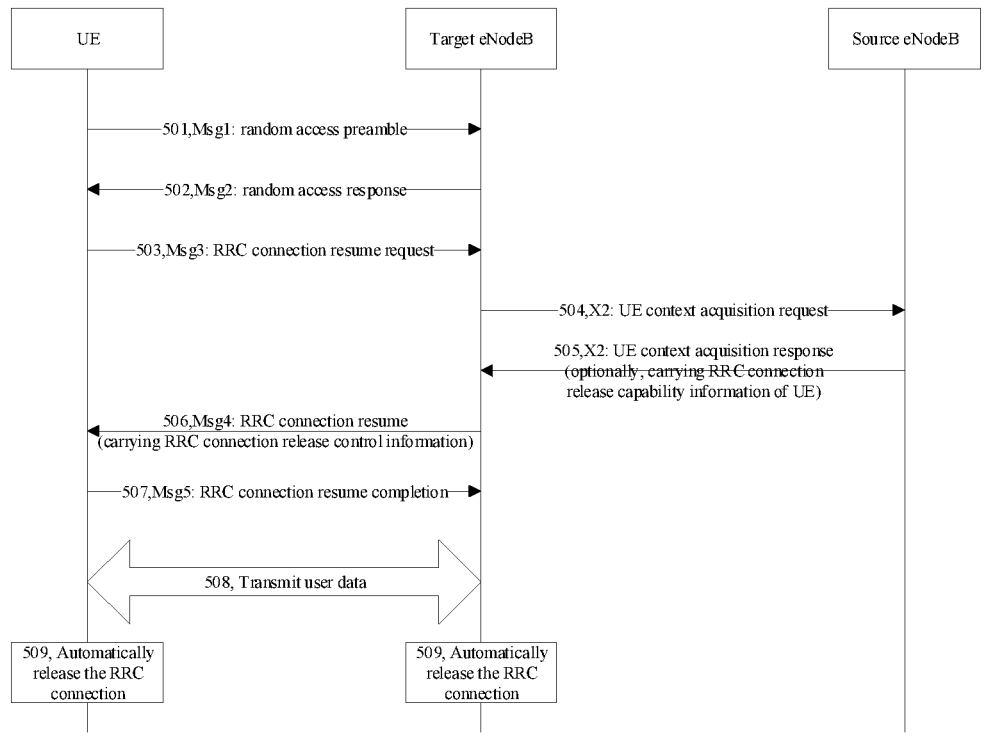
FIG. 5 is a flowchart illustrating reporting of RRC connection auto-release capability information by a UE and configuration of RRC connection release control information according to an embodiment of the present disclosure.

FIG. 5 is a flowchart illustrating acquisition of RRC connection auto-release capability information and RRC connection release control information according to an embodiment of the present disclosure. The process shown in FIG. 5 includes the steps described below.

In step 501, the UE sends a Msg1 (random access preamble) message to a target eNodeB.

In step 502, the target eNodeB sends a Msg2 (random access response) message to the UE.

In step 503, the UE sends a Msg3 (RRC connection resume request) message to the target eNodeB, where the RRC connection resume request message carries the RRC connection release capability information of the UE.

In step 504, the target eNodeB sends a UE context acquisition request message to a source eNodeB.

In step 505, the source eNodeB sends a UE context acquisition response message to the target eNodeB, where the UE context acquisition response message carries the RRC connection release capability information of the UE.

The RRC connection release capability information of the UE may be indirectly indicated by whether the UE supports data inactivity timer processing, whether the UE is capable of releasing RRC connection immediately after sending BSR=0 or whether the UE is capable of receiving the RRC connection release indication sent by the eNodeB.

In step 506, the target eNodeB sends a Msg4 (RRC connection resume) message to the UE, where the RRC connection resume message carries the RRC connection release control information.

The configured RRC connection release control information includes at least one of an RRC release mode indication, an extended wait timer, or carrier redirection information.

In step 507, the UE sends a Msg5 (RRC connection resume completion) message to the target eNodeB.

In step 508, the UE and the target eNodeB transmit data based on the established RRC connection.

In step 509, the RRC connection is automatically released based on the RRC connection release capability information and the RRC connection release control information after data transmission between the UE and the target eNodeB is completed.

In other embodiments of the present disclosure, the RRC connection release capability information of the UE sent by the source eNodeB to the target eNodeB may be carried in a handover request message.

Embodiment Six

Figure 6:
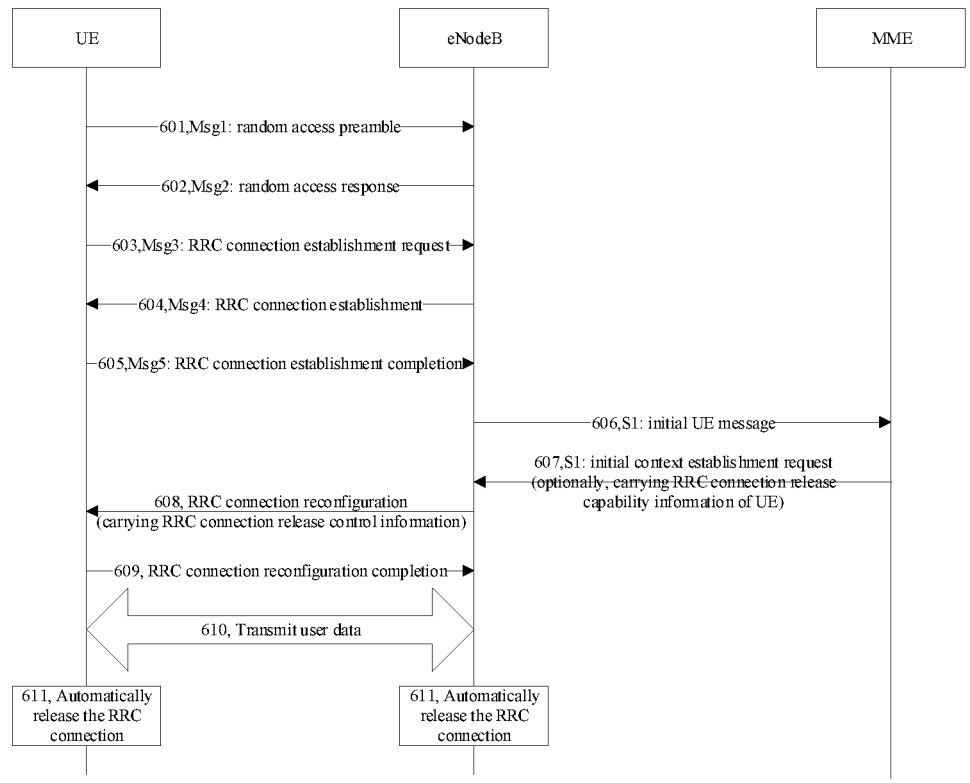
FIG. 6 is a flowchart illustrating reporting of RRC connection auto-release capability information by a UE and configuration of RRC connection release control information according to an embodiment of the present disclosure.

FIG. 6 is a flowchart illustrating acquisition of RRC connection auto-release capability information and RRC connection release control information according to an embodiment of the present disclosure. The process shown in FIG. 6 includes the steps described below.

In step 601, the UE sends a Msg1 (random access preamble) message to the eNodeB.

In step 602, the eNodeB sends a Msg2 (random access response) message to the UE.

In step 603, the UE sends a Msg3 (RRC connection establishment request) message to the eNodeB.

In step 604, the eNodeB sends a Msg4 (RRC connection establishment) message to the UE.

In step 605, the UE sends a Msg5 (RRC connection establishment completion) message to the eNodeB.

In step 606, the eNodeB sends an initial UE message to an MME.

In step 607, the MME sends an initial context establishment request message to the eNodeB, where the initial context establishment request message carries the RRC connection release capability information of the UE.

The RRC connection release capability information of the UE may be indirectly indicated by whether the UE supports data inactivity timer processing, whether the UE is capable of releasing RRC connection immediately after sending BSR=0 or whether the UE is capable of receiving the RRC connection release indication sent by the eNodeB.

In step 608, the eNodeB configures the RRC connection release control information for the UE in a subsequent RRC connection reconfiguration message.

The RRC connection release control information includes at least one of an RRC release mode indication, an extended wait timer, or carrier redirection information.

In step 609, the UE sends an RRC connection reconfiguration completion message to the eNodeB.

In step 610, the UE and the eNodeB transmit data based on the established RRC connection.

In step 611, the RRC connection is automatically released based on the RRC connection release capability information and the RRC connection release control information after data transmission between the UE and the eNodeB is completed.

In other embodiments of the present disclosure, the Msg3 may be an RRC connection resume request message, an RRC connection re-establishment request message or the like; accordingly, the Msg4 may be an RRC connection resume message, an RRC connection re-establishment message or the like and Msg5 may be an RRC connection resume completion message, an RRC connection re-establishment completion message or the like.

In other embodiments of the present disclosure, the RRC connection release capability information of the UE sent by the MME to the eNodeB may be carried in one of a UE wireless capability matching request message, a UE context resume response message, a downlink non-access stratum transport message, a connection establishment indication message, a UE information transmission message, a handover required message, or a handover request message.

Embodiment Seven

Figure 7:
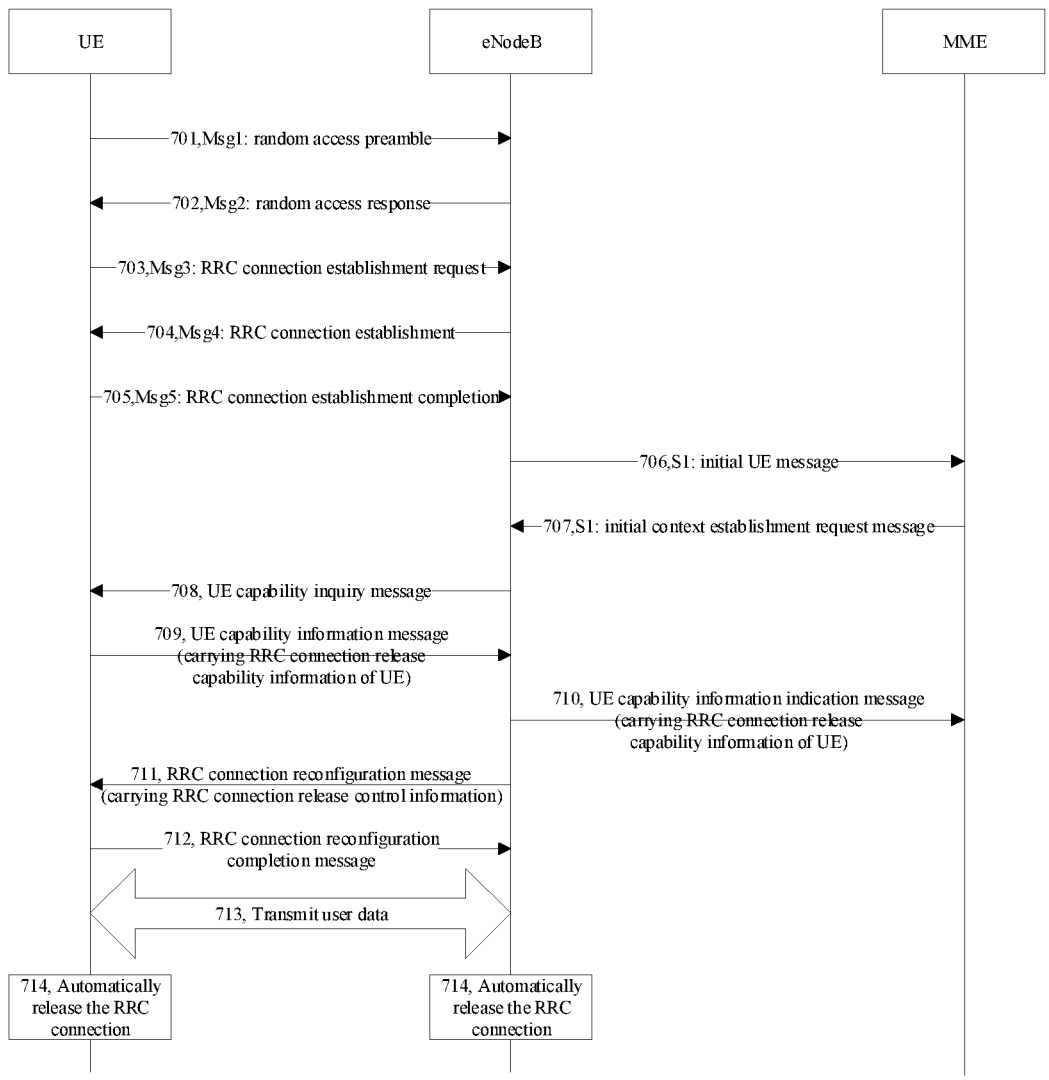
FIG. 7 is a flowchart illustrating reporting of RRC connection auto-release capability information by a UE and configuration of RRC connection release control information according to an embodiment of the present disclosure.

FIG. 7 is a flowchart illustrating acquisition of RRC connection auto-release capability information of the UE and the RRC connection release control information according to an embodiment of the present disclosure. The process shown in FIG. 7 includes the steps described below.

In step 701, the UE sends a Msg1 (random access preamble) message to the eNodeB.

In step 702, the eNodeB sends a Msg2 (random access response) message to the UE.

In step 703, the UE sends a Msg3 (RRC connection establishment request) message to the eNodeB.

In step 704, the eNodeB sends a Msg4 (RRC connection establishment) message to the UE.

In step 705, the UE sends a Msg5 (RRC connection establishment completion) message to the eNodeB.

In step 706, the eNodeB sends an initial UE message to an MME.

In step 707, the MME sends an initial context establishment request message to the eNodeB.

In step 708, the eNodeB sends a UE capability inquiry message to the UE if the eNodeB does not acquire RRC connection release capability information of the UE from the initial context establishment request message.

In step 709, the UE sends a UE capability information message to the eNodeB after the UE receives the UE capability inquiry message, where the UE capability information message carries the RRC connection release capability information of the UE.

The RRC connection release capability information of the UE may be indirectly indicated by whether the UE supports data inactivity timer processing, whether the UE is capable of releasing RRC connection immediately after sending BSR=0 or whether the UE is capable of receiving the RRC connection release indication sent by the eNodeB.

In step 710, the eNodeB sends a UE capability information indication message to the MME, where the UE capability information indication message carries the RRC connection release capability information of the UE for use in subsequent UE capability acquisition.

In step 711, the eNodeB sends an RRC connection reconfiguration message to the UE after receiving the RRC connection release capability information of the UE, where the RRC connection reconfiguration message carries the RRC connection release control information.

The RRC connection release control information includes at least one of an RRC release mode indication, an extended wait timer, or carrier redirection information.

The latest received RRC connection release control information applies if the UE receives the RRC connection release control information from the base station multiple times.

In step 712, the UE sends an RRC connection reconfiguration completion message to the eNodeB.

In step 713, the UE and the eNodeB transmit data based on the established RRC connection.

In step 714, the RRC connection is automatically released based on the RRC connection release capability information and the RRC connection release control information after data transmission between the UE and the eNodeB is completed.

In other embodiments of the present disclosure, the RRC connection release capability information of the UE reported to the base station by the UE may be one of an RRC connection establishment completion message, an RRC connection resume completion message, an RRC connection reconfiguration completion message, an RRC connection re-establishment completion message or a UE information response message.

Embodiment Eight

Figure 8:
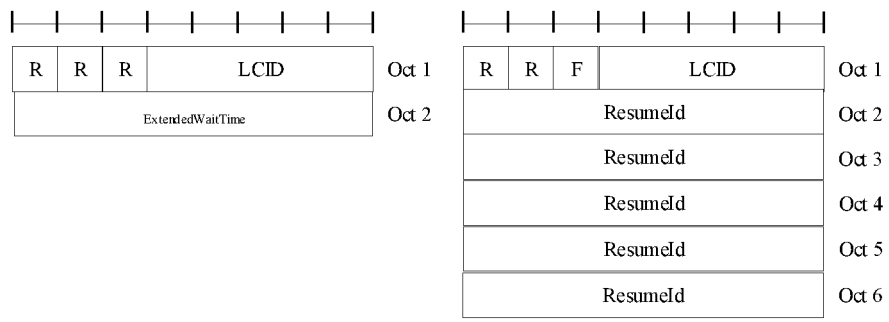
FIG. 8 is a flowchart illustrating configuration of RRC connection release control information through a MAC control element according to an embodiment of the present disclosure.

FIG. 8 is a flowchart illustrating configuration of RRC connection release control information through a MAC CE according to an embodiment of the present disclosure.

An extended wait timer is indicated by a newly defined MAC CE. As shown in FIG. 8(a), when a logical channel identifier (LCID) is an LCID corresponding to the predefined extended wait timer, the value of the ExtendedWaitTime field of the MAC CE is the value of the extended wait timer configured for the network.

An RRC connection release mode is indicated by a newly defined MAC CE. As shown in FIG. 8(b), when the LCID is an LCID corresponding to the predefined RRC release mode indication, the F field of the MAC CE is used for indicating that the context of the UE is stored before the release or indicating that all radio resources are released when RRC connection is released. If the F field indicates that the context of the UE is stored before the release, the ResumeId field is carried for indicating the resume identifier of the context of the UE; otherwise, the ResumeId field is not carried.

In this embodiment, two MAC CEs are used for configuration of the extended wait timer related to RRC connection release and configuration of the resume identifier related to RRC connection release respectively by way of example. In other embodiments of the present disclosure, one MAC CE may be used for configuration of the extended wait timer related to RRC connection release, configuration of the resume identifier related to RRC connection release, and configuration of other information related to RRC connection release.

Embodiment Nine

Figure 9:
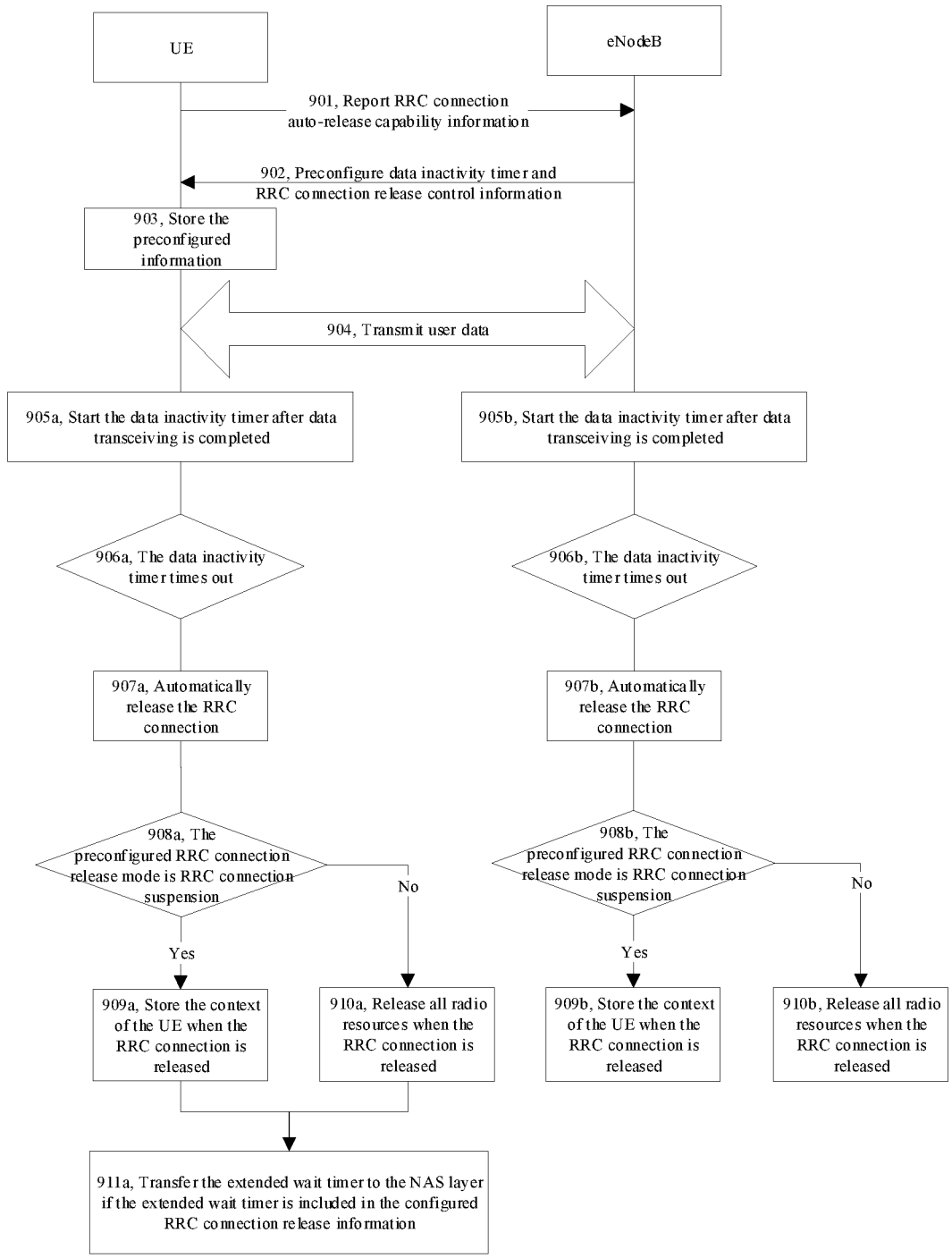
FIG. 9 is a flowchart of RRC connection auto-release triggered by a data inactivity timer according to an embodiment of the present disclosure.

FIG. 9 is a flowchart of RRC connection auto-release triggered by timing out of a data inactivity timer according to an embodiment of the present disclosure. The process shown in FIG. 9 includes the steps described below.

In step 901, the UE, which has RRC connection auto-release capability, pre-reports RRC connection capability information of the UE to an eNodeB.

It is to be noted that in other embodiments, the RRC connection capability information may not be reported by the UE.

In step 902, the eNodeB preconfigures the data inactivity timer and RRC connection release control information for the UE.

In step 903, the preconfigured data inactivity timer and RRC connection release control information are stored in the UE.

In step 904, the UE and the eNodeB transmit data.

The UE and the eNodeB release RRC connection according to the starting and/or stopping mechanism of the data inactivity timer.

The process of RRC connection auto-release at the UE includes the steps described below.

In step 905a, the UE starts the data inactivity timer after data transceiving is completed.

In step 906a, when the data inactivity timer times out, go to step 907a.

In step 907a, the RRC connection of the UE is automatically released according to the configured RRC connection release control information.

In step 908a, if the configured RRC connection release mode is RRC connection suspension, step 909a is performed; otherwise, step 910a is performed.

In step 909a, the context of the UE is stored when the RRC connection is released. Then step 911a is performed.

In step 910 a, all radio resources of the UE are released when the RRC connection is released. Then step 911 a is performed.

In step 911a, if an extended wait timer is included in the configured RRC connection release information, the extended wait timer is transferred to the NAS layer.

The process of RRC connection auto-release at the eNodeB includes the steps described below.

In step 905b, the eNodeB starts the data inactivity timer after data transceiving is completed.

In step 906b, when the data inactivity timer times out, go to step 907.

In step 907b, the RRC connection of the UE is automatically released according to the RRC connection release control information configured for the UE.

In step 908b, if the configured RRC connection release mode is RRC connection suspension, step 909b is performed; otherwise, step 910b is performed.

In step 909b, the context of the UE is stored when the RRC connection is released. Then the process ends.

In step 910b, all radio resources of the UE are released when the RRC connection is released. Then the process ends.

The context of the UE includes at least one of RRC configuration information, security context configuration, packet data convergence protocol (PDCP) state, cell radio network temporary identify (c-RNTI) configuration or other UE access stratum (AS) context; signaling radio bearer (SRB), data radio bearer (DRB) or other radio bearer information.

The radio resources include RLC entities, MAC configuration, PDCP entities and other radio resources related to the RRC connected state.

Embodiment Ten

Figure 10:
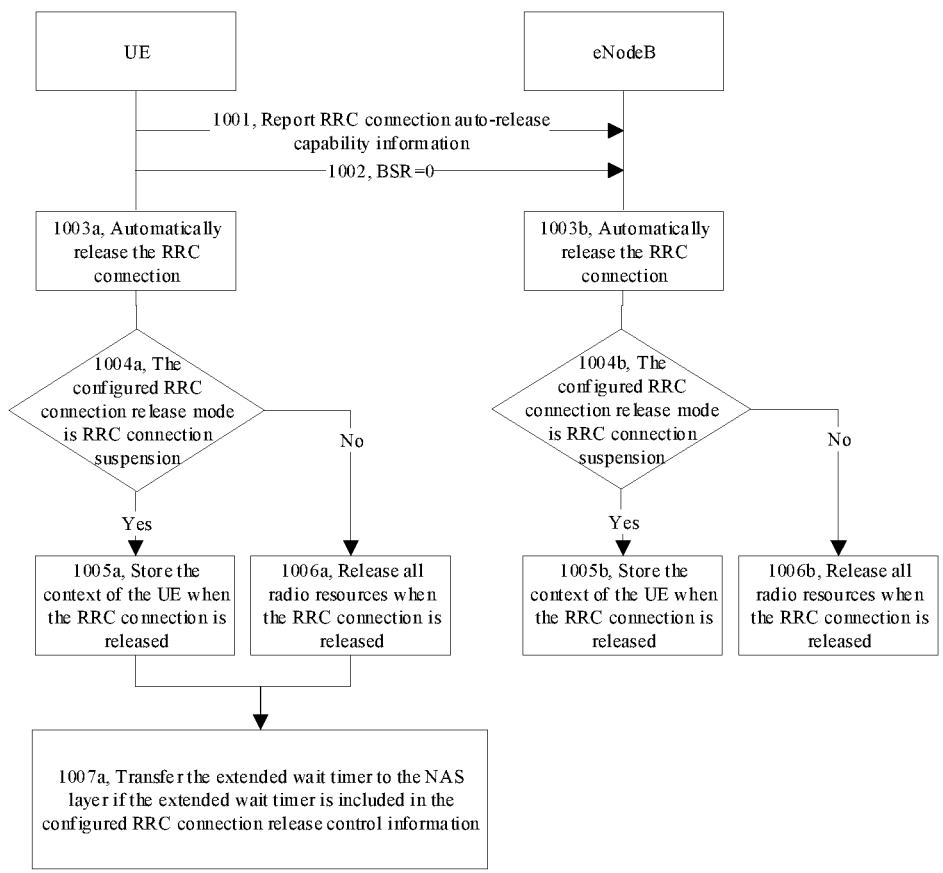
FIG. 10 is a flowchart of RRC connection auto-release triggered by Buffer Size Report (BSR)=0 reported by a UE according to an embodiment of the present disclosure.

FIG. 10 is a flowchart of RRC connection auto-release triggered by BSR=0 reported by a UE according to an embodiment of the present disclosure. The process shown in FIG. 10 includes the steps described below.

In step 1001, a UE, which has RRC connection auto-release capability, pre-reports RRC connection capability information of the UE to an eNodeB.

In step 1002, when the UE which has RRC connection auto-release capability completes data transmission and has no data transmission requirement, the UE sends the BSR=0 indication to the eNodeB and the UE and the eNodeB start RRC connection release.

The process of RRC connection auto-release at the UE includes the steps described below.

In step 1003a, the RRC connection of the UE is automatically released according to the configured RRC connection release control information.

In step 1004a, if the configured RRC connection release mode is RRC connection suspension, step 1005a is performed; otherwise, step 1006a is performed.

In step 1005a, the context of the UE is stored when the RRC connection is released. Then step 1007a is performed.

In step 1006a, all radio resources of the UE are released when the RRC connection is released. Then step 1007a is performed.

In step 1007a, if an extended wait timer is included in the configured RRC connection release information, the extended wait timer is transferred to the NAS layer.

The process of RRC connection auto-release at the eNodeB includes the steps described below.

In step 1003b, if the eNodeB acquires the RRC connection auto-release capability of the UE, then after the eNodeB receives the BSR=0 information sent by the UE, the RRC connection of the UE is automatically released according to the RRC connection release control information configured for the UE.

In step 1004b, if the configured RRC connection release mode is RRC connection suspension, step 1005b is performed; otherwise, step 1006b is performed.

In step 1005b, the context of the UE is stored when the RRC connection is released. Then the process ends.

In step 1006b, all radio resources of the UE are released when the RRC connection is released. Then the process ends.

The context of the UE includes at least one of RRC configuration information, security context configuration, PDCP state, c-RNTI configuration or other UE AS context; SRB, DRB or other radio bearer information.

The radio resources include RLC entities, MAC configuration, PDCP entities and other radio resources related to the RRC connected state.

Embodiment Eleven

Figure 11:
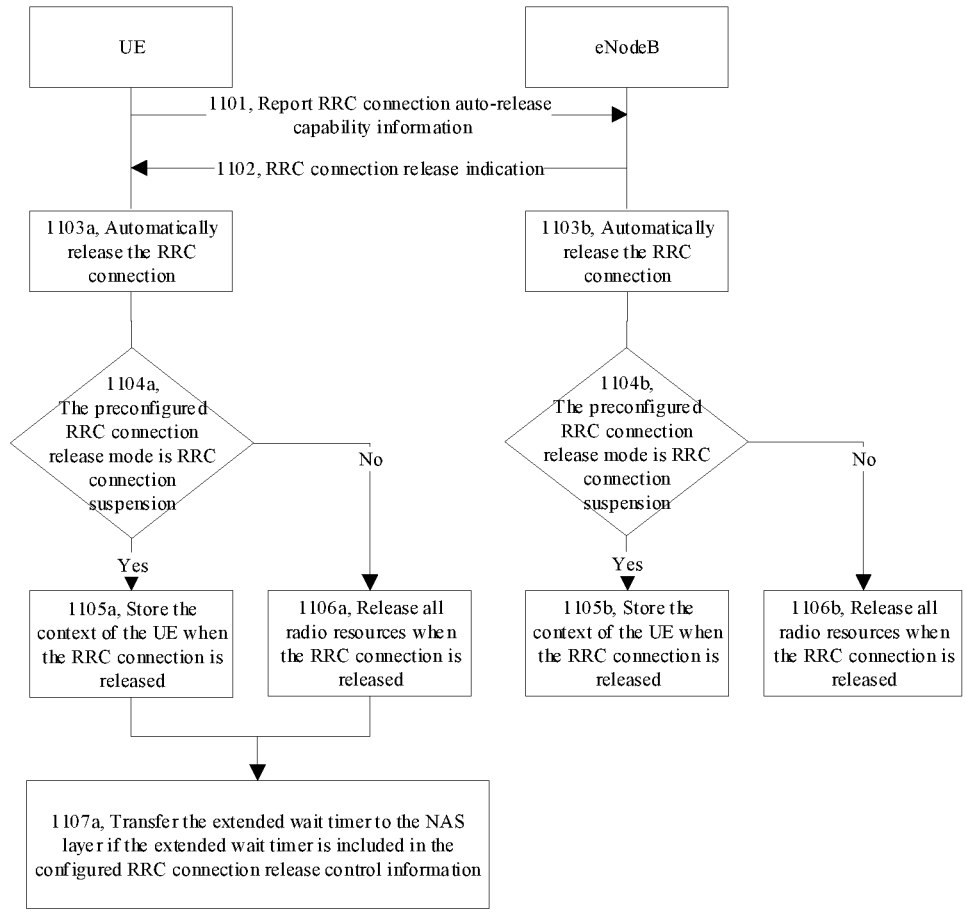
FIG. 11 is a flowchart of RRC connection auto-release triggered by an RRC connection release indication sent by an eNodeB according to an embodiment of the present disclosure.

FIG. 11 is a flowchart of RRC connection auto-release triggered by an RRC connection release indication sent by an eNodeB according to an embodiment of the present disclosure. The process shown in FIG. 11 includes the steps described below.

In step 1101, a UE, which has RRC connection auto-release capability, pre-reports RRC connection capability information of the UE to an eNodeB.

In step 1102, after data transceiving is completed, the eNodeB sends the RRC connection release indication to the UE which has RRC connection auto-release capability; and the UE and the eNodeB start the RRC connection auto-release of the UE according to the configured RRC connection release control information.

The process of RRC connection auto-release at the UE includes the steps described below.

In step 1103a, when the UE receives the RRC connection release indication sent by the eNodeB, the RRC connection of the UE is automatically released according to the configured RRC connection release control information.

In step 1104a, if the configured RRC connection release mode is RRC connection suspension, step 1105a is performed; otherwise, step 1106a is performed.

In step 1105a, the context of the UE is stored when the RRC connection is released. Then step 1107a is performed.

In step 1106a, all radio resources of the UE are released when the RRC connection is released. Then step 1107a is performed.

In step 1107a, if an extended wait timer is included in the configured RRC connection release information, the extended wait timer is transferred to the NAS layer.

The process of RRC connection auto-release at the eNodeB includes the steps described below.

In step 1103b, after the eNodeB sends the RRC connection release indication to the UE, the RRC connection of the UE is automatically released according to the RRC connection release control information configured for the UE.

In step 1104b, if the configured RRC connection release mode is RRC connection suspension, step 1105b is performed; otherwise, step 1106b is performed.

In step 1105b, the context of the UE is stored when the RRC connection is released. Then the process ends.

In step 1106b, all radio resources of the UE are released when the RRC connection is released. Then the process ends.

The context of the UE includes at least one of RRC configuration information, security context configuration, PDCP state, c-RNTI configuration or other UE AS context; SRB, DRB or other radio bearer information.

The radio resources include RLC entities, MAC configuration, PDCP entities and other radio resources related to the RRC connected state.

Embodiment Twelve

Figure 12:
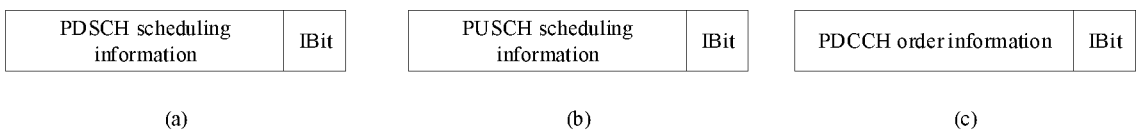
FIG. 12 is a schematic diagram illustrating that data transmission completion is indicated by DCI according to an embodiment of the present disclosure.

The RRC connection release indication in embodiment eleven may be carried in DCI information. FIG. 12 is a schematic diagram illustrating that an RRC connection release indication is carried in downlink control information (DCI) according to an embodiment of the present disclosure. The method of this embodiment is described below.

A newly defined DCI format is used for indicating whether data transmission will be performed in the downlink subsequently, that is, the DCI carries the RRC connection release indication.

The new DCI format may be extended based on at least one of the current DCI formats: the DCI format of physical uplink shared channel (PDSCH) scheduling as shown in (a) of FIG. 12, the DCI format of physical uplink shared channel (PUSCH) as shown in (b) of FIG. 12 or the DCI format of a physical downlink control channel (PDCCH) order as shown in (c) of FIG. 12.

A particular extension mode may be to use one of the reserved bits based on the current format to carry the RRC connection release indication. A first preset value of this reserved bit indicates RRC connection release of the UE. For example, a preset value of 1 indicates RRC connection release of the UE. Of course, this is just an example. Other values may be used to indicate RRC connection release of the UE, or more bits are used to carry the RRC connection release indication, or a single bit is used to carry the RRC connection release indication with no reserved bit used. Of course, other information other than DCI may be used to carry the RRC connection release indication.

Embodiment Thirteen

The RRC connection release indication in embodiment eleven may be carried in information in MAC CE format.

Figure 13A:
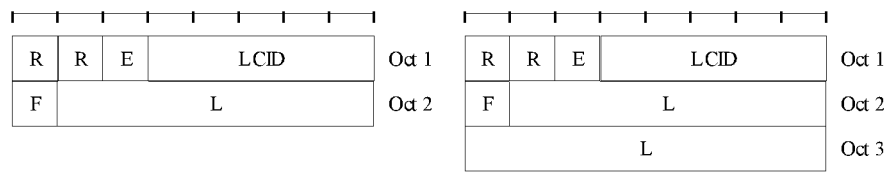
FIGS. 13(a) through 13(c) are schematic diagrams illustrating that data transmission completion is indicated by MAC CE according to an embodiment of the present disclosure.
Figure 13B:
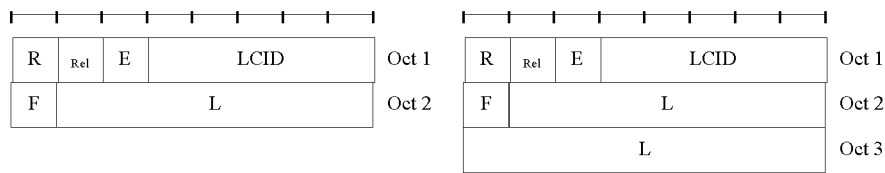
Figure 13C:
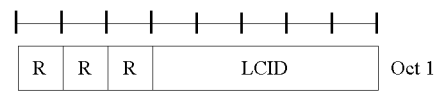

FIGS. 13(a) through 13(c) are schematic diagrams illustrating that data transmission completion is indicated by MAC CE according to an embodiment of the present disclosure.

In the related art, the MAC CE SubHeader of DL-SCH is as shown in FIG. 13(a) and includes the R/R/E/LCID/F/L field and the L field includes 7 bits as shown in the left figure of FIG. 13(a) or includes the R/R/E/LCID/F/L field and the L field includes 5 bits as shown in the right figure of FIG. 13(a).

In this embodiment, the reserved bit in DL-SCH MAC-CE and/or the reserved value of LCID is used to indicate whether the UE will send data subsequently. For example, a designated R bit in MAC SubHeader is used to carry the RRC connection release indication. The case where the designated R bit takes a preset value indicates that data transmission is completed and indicates that the UE releases the RRC connection. For example, the second R bit in FIG. 13(a) may be redefined as the Rel field (as shown in FIG. 13(b)). The case where the value of the Rel field is a preset value indicates that data transmission is completed and indicates that the UE releases the RRC connection. The preset value may be 1 or other values.

If LCID is used for indication, it is needed to add one MAC CE as shown in FIG. 13(c) where LCID carries the RRC release indication. The case where the LCID value of the MAC CE sent by the eNodeB to the UE is a predefined RRC release indication value, the LCID indicates that the UE releases the RRC connection. The predefined RRC release indication value may be a certain value selected from 01011 to 10100 that are reserved.

Embodiment Fourteen

Figure 14:
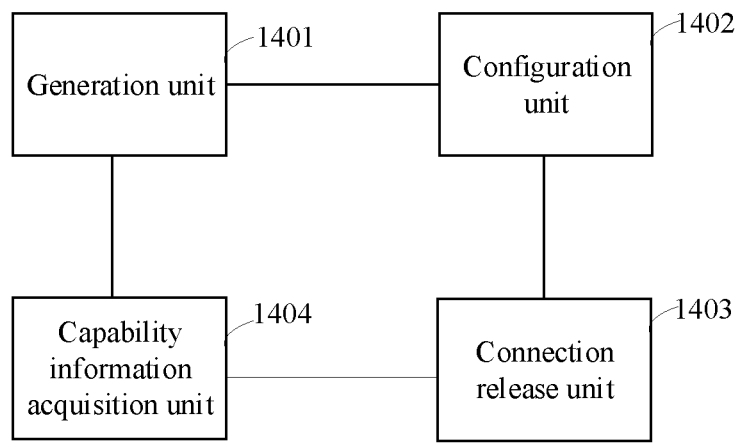
FIG. 14 is a block diagram of a device for releasing radio resource control connection according to an embodiment of the present disclosure.

This embodiment provides a device for releasing RRC connection. As shown in FIG. 14, the device includes a generation unit 1401, a configuration unit 1402 and a connection release unit 1403.

The generation unit 1401 is configured to generate RRC connection release control information of a UE.

The configuration unit 1402 is configured to configure the RRC connection release control information for the UE before the connection release unit 1403 is triggered to release the RRC connection of the UE.

The connection release unit 1403 is configured to make a decision according to the RRC connection release control information when releasing the RRC connection of the UE.

In an optional embodiment of the present disclosure, the device for releasing RRC connection further comprises a capability information acquisition unit 1404. The capability information acquisition unit 1404 is configured to acquire RRC connection release capability information of the UE before the configuration unit 1402 configures the RRC connection release control information for the RRC.

In an optional embodiment of the present disclosure, the connection release unit 1403 is further configured to be triggered to release the RRC connection of the UE when one of the following conditions is satisfied: a configured data inactivity timer times out; a buffer status report indicating 0 buffer octets sent by the UE is received; or the base station sends the RRC connection release indication to the UE.

In an optional embodiment of the present disclosure, the connection release unit 1403 is further configured to send the RRC connection release indication to the UE in one of the following manners: carrying the RRC connection release indication in a predefined downlink control information format; or carrying the RRC connection release indication in a predefined MAC CE format.

It is to be noted that implementation details in other embodiments may be applied to this embodiment.

Embodiment Fifteen

Figure 15:
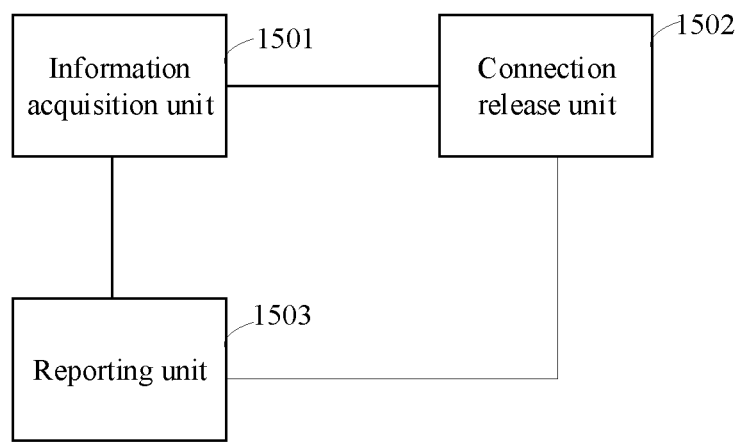
FIG. 15 is a block diagram of a device for releasing radio resource control connection according to an embodiment of the present disclosure.

This embodiment provides a device for releasing RRC connection. As shown in FIG. 15, the device includes an information acquisition unit 1501 and a connection release unit 1502.

The information acquisition unit 1501 is configured to acquire RRC connection release control information from a base station before the connection release unit 1502 automatically releases the RRC connection of a UE.

The connection release unit 1502 is configured to make a decision according to the RRC connection release control information or to transport the RRC connection release control information to a higher layer when automatically releasing the RRC connection of the UE.

In an optional embodiment of the present disclosure, the device for releasing RRC connection further comprises a reporting unit 1503. The reporting unit 1503 is configured to report RRC connection release capability information of the UE to the base station before the information acquisition unit 1501 acquires the RRC connection release control information from the base station.

It is to be noted that implementation details in other embodiments may be applied to this embodiment.

Embodiment Sixteen

This embodiment provides a base station. The base station includes a memory and a processor. The memory stores a program that, when executed by the processor, causes the processor to perform the following operations: configuring RRC connection release control information for a UE before being triggered to release a RRC connection of the UE; and making a decision according to the RRC connection release control information when releasing the RRC connection of the UE.

Another embodiment provides a computer-readable storage medium. The computer-readable storage medium stores one or more programs. One or more processors execute the one or more programs to perform the following operations: configuring RRC connection release control information for a UE before being triggered to release a RRC connection of the UE; and making a decision according to the RRC connection release control information when releasing the RRC connection of the UE.

The computer-readable storage medium may be a U disk, a read-only memory (ROM), a random access memory (RAM), a mobile hard disk, a magnetic disk, an optical disk or another medium capable of storing program codes.

Embodiment Seventeen

This embodiment provides a UE. The user equipment includes a memory and a processor. The memory stores a program that, when read and executed by the processor, causes the processor to perform the following operations: acquiring RRC connection release control information from a base station before automatically releasing a RRC connection of the UE; and making a decision according to the RRC connection release control information or transporting the RRC connection release control information to a higher layer when automatically releasing the RRC connection of the UE.

Another embodiment provides a computer-readable storage medium. The computer-readable storage medium stores one or more programs. One or more processors execute the one or more programs to perform the following operations: acquiring RRC connection release control information from a base station before automatically releasing a RRC connection of the UE; and making a decision according to the RRC control connection release control information or transporting the RRC connection release control information to a higher layer when automatically releasing the RRC connection of the UE.

The computer-readable storage medium may be a U disk, a read-only memory (ROM), a random access memory (RAM), a mobile hard disk, a magnetic disk, an optical disk or another medium capable of storing program codes.

Although the embodiments disclosed by the present disclosure are as described above, the content thereof is merely embodiments for facilitating the understanding of the present disclosure and is not intended to limit the present disclosure. Any person skilled in the art to which the present disclosure pertains may make modifications and changes to the implementation forms and details without departing from the spirit and scope disclosed by the present disclosure, but the scope of the present disclosure is still subject to the scope defined by the appended claims.

INDUSTRIAL APPLICABILITY

In the present disclosure, a UE is configured with RRC connection release control information before automatically releasing RRC connection of the UE so that the UE can perform subsequent operations according to the RRC connection release control information after automatically releasing the RRC connection, thereby reducing UE power consumption.

What is claimed is:

1. A method for releasing a radio resource control (RRC) connection, comprising:
   obtaining, by a base station, RRC connection release capability information of a user equipment (UE);
   configuring, by the base station, RRC connection release control information for the UE, wherein the RRC connection release control information comprises at least one of: an RRC release mode indication, an extended wait timer, or carrier redirection information for determining a camped carrier of the UE entering an idle mode;
   before automatically releasing an RRC connection between the UE and the base station, sending, by the base station, to the UE the RRC connection release control information carried in one of an RRC connection establishment message, an RRC connection resume message, an RRC connection reconfiguration message, or an RRC connection re-establishment message; and
   releasing automatically, by the base station, the RRC connection between the UE and the base station, and making, by the base station, a decision according to the RRC connection release control information,
   wherein releasing automatically, by the base station, the RRC connection between the UE and the base station is based on one of the following conditions:
   a triggered data inactivity timer timing out without sending an RRC connection release indication to the UE and receiving Radio Link Control (RLC) Acknowledgement (Ack) from the UE;

receiving a buffer status report indicating 0 buffer octets sent by the UE and determining that the UE has RRC connection auto-release capability according to the obtained RRC connection release capability information of the UE, while not sending an RRC connection release indication to the UE and not receiving Radio Link Control (RLC) Acknowledgement (Ack) from the UE; or sending an RRC connection release indication which does not comprise the RRC connection release control information to the UE over a predefined downlink control information (DCI) format or a predefined media access control control element (MAC CE) format, while not receiving Radio Link Control (RLC) Acknowledgement (Ack) from the UE.

2. The method of claim 1, wherein the base station acquires the RRC connection release capability information of the UE in one of the following manners:
   acquiring the RRC connection release capability information of the UE from the UE;
   acquiring the RRC connection release capability information of the UE from a mobile management entity (MME); or
   acquiring the RRC connection release capability information of the UE from a source base station of the UE.

3. The method of claim 1, wherein making, by the base station, the decision according to the RRC connection release control information comprises:
   in response to determining that the RRC release mode indication carried in the RRC connection release control information configured by the base station for the UE indicates that context of the UE is stored during the release of the RRC connection, releasing, by the base station, the RRC connection by suspending the context of the UE; otherwise, releasing, by the base station, all radio resources of the UE.

4. A device for releasing a radio resource control (RRC) connection, comprising:
   a processor; and
   a memory for storing instructions executable by the processor,
   wherein the processor, when executing the instructions, is configured to:
   obtain RRC connection release capability information of a user equipment (UE);
   generate RRC connection release control information of the UE, wherein the RRC connection release control information comprises at least one of: an RRC release mode indication, an extended wait timer, or carrier redirection information for determining a camped carrier of the UE entering an idle mode;
   before automatically releasing an RRC connection between the UE and the base station, send to the UE the RRC connection release control information carried in one of an RRC connection establishment message, an RRC connection resume message, an RRC connection reconfiguration message, or an RRC connection re-establishment message; and
   release automatically the RRC connection between the UE and the base station, and make a decision according to the RRC connection release control information,
   wherein releasing automatically the RRC connection between the UE and the base station is based on one of the following conditions:

a triggered data inactivity timer timing out without sending an RRC connection release indication to the UE and receiving Radio Link Control (RLC) Acknowledgement (Ack) from the UE;

receiving a buffer status report indicating 0 buffer octets sent by the UE and determining that the UE has RRC connection auto-release capability according to the obtained RRC connection release capability information of the UE, while not sending an RRC connection release indication to the UE and not receiving Radio Link Control (RLC) Acknowledgement (Ack) from the UE; or sending an RRC connection release indication which does not comprise the RRC connection release control information to the UE over a predefined downlink control information (DCI) format or a predefined media access control control element (MAC CE) format, while not receiving Radio Link Control (RLC) Acknowledgement (Ack) from the UE.

5. A base station, comprising a memory and a processor, wherein the memory stores a program which, when executed by the processor, causes the processor to implement the method for releasing a radio resource control (RRC) connection of claim 1.

6. A method for releasing a radio resource control (RRC) connection, comprising:
   sending, by a user equipment (UE), RRC connection release capability information to a base station;
   acquiring, by the UE, RRC connection release control information carried in one of an RRC connection establishment message, an RRC connection resume message, an RRC connection reconfiguration message, or an RRC connection re-establishment message sent from the base station before automatically releasing an RRC connection between the UE and the base station, wherein the RRC connection release control information comprises at least one of: an RRC release mode indication, an extended wait timer, or carrier redirection information for determining a camped carrier of the UE entering an idle mode; and
   releasing automatically, by the UE, the RRC connection between the base station and the UE, and, making, by the UE, a decision according to the RRC connection release control information or transporting the RRC connection release control information to a higher layer to enable the higher layer to make a decision,
   wherein releasing automatically, by the UE, the RRC connection between the base station and the UE is based on one of the following conditions:
   a triggered data inactivity timer configured for the UE by a network timing out without receiving an RRC connection release indication from the base station and sending Radio Link Control (RLC) Acknowledgement (Ack) to the base station;
   determining that the UE has RRC connection auto-release capability according to the RRC connection release capability information of the UE and sending a buffer status report indicating 0 buffer octets to the base station, while not receiving an RRC connection release indication from the base station and not sending Radio Link Control (RLC) Acknowledgement (Ack) to the base station; or
   receiving an RRC connection release indication which does not comprise the RRC connection release control information sent by the base station over a predefined downlink control information (DCI) format or a predefined media access control control element (MAC CE) format while not sending Radio Link Control (RLC) Acknowledgement (Ack) to the base station.

7. The method of claim 6, wherein when the UE receives the RRC connection release control information from the base station multiple times, latest received RRC connection release control information applies.

8. The method of claim 6, wherein making, by the UE, the decision according to the RRC connection release control information comprises:
   in response to determining that the RRC release mode indication carried in the RRC connection release control information indicates that context of the UE is stored during the release of the RRC connection, automatically releasing, by the UE, the RRC connection by suspending the context of the UE; otherwise, releasing, by the UE, all radio resources of the UE.

9. The method of claim 6, wherein transporting, by the UE, the RRC connection release control information to the higher layer when the UE automatically releases the RRC connection comprises:
   transferring, by the UE, the extended wait timer carried in the RRC connection release control information to the higher layer when the UE automatically releases the RRC connection.

10. A device for releasing radio resource control (RRC) connection, comprising:
    a processor; and
    a memory for storing instructions executable by the processor,
    wherein the processor, when executing the instructions, is configured to implement the method for releasing a radio resource control (RRC) connection of claim 6.

11. A user equipment (UE), comprising a memory and a processor, wherein the memory stores a program that, when read and executed by the processor, causes the processor to implement the method for releasing a radio resource control (RRC) connection of claim 6.

12. A computer-readable non-transient storage medium, which stores computer-executable instructions configured for implementation of the method for releasing a radio resource control (RRC) connection of claim 1.

13. A computer-readable non-transient storage medium, which stores computer-executable instructions configured for implementation of the method for releasing a radio resource control (RRC) connection of claim 6.

* * * * *